US012670093B1

(12) United States Patent
Vyas et al.

(10) Patent No.: US 12,670,093 B1
(45) Date of Patent: Jun. 30, 2026

(54) SYSTEMS, METHODS, AND MEDIA FOR PROCESSING SUB-INDIRECTION-UNIT DATA IN SOLID-STATE DRIVES

(71) Applicant: SK hynix NAND Product Solutions Corp., Rancho Cordova, CA (US)

(72) Inventors: Vinit Vyas, Folsom, CA (US); Rucha Rasane, Folsom, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 19/006,862

(22) Filed: Dec. 31, 2024

(51) Int. Cl.
*G06F 12/02* (2006.01)
*G06F 3/06* (2006.01)

(52) U.S. Cl.
CPC ........ *G06F 12/0246* (2013.01); *G06F 3/0611* (2013.01); *G06F 3/064* (2013.01); *G06F 3/0679* (2013.01)

(58) Field of Classification Search
CPC .. G06F 12/0246; G06F 12/02; G06F 12/0223; G06F 12/023; G06F 12/0238; G06F 12/0292; G06F 12/1009; G06F 3/0611; G06F 3/064; G06F 3/0644; G06F 3/0647; G06F 3/0655; G06F 3/0673; G06F 3/0679
See application file for complete search history.

(56) References Cited

U.S. PATENT DOCUMENTS

| | | | | |
|---|---|---|---|---|
| 2010/0257308 A1* | 10/2010 | Hsu | ...................... | G06F 12/0246 |
| | | | | 711/E12.019 |
| 2012/0226850 A1* | 9/2012 | Nakanishi | ........... | G06F 12/1009 |
| | | | | 711/E12.059 |
| 2015/0081950 A1* | 3/2015 | Nezu | ................... | G06F 12/0246 |
| | | | | 711/103 |
| 2016/0019142 A1* | 1/2016 | Lin | ....................... | G06F 3/0608 |
| | | | | 711/103 |
| 2019/0138468 A1* | 5/2019 | Li | .......................... | G06F 3/0656 |
| 2021/0049064 A1* | 2/2021 | Liang | ...................... | G06F 3/065 |
| 2023/0342049 A1* | 10/2023 | Frolikov | ............... | G06F 3/0632 |
| 2023/0418501 A1* | 12/2023 | Koo | ...................... | G06F 3/0679 |

* cited by examiner

*Primary Examiner* — Michael Krofcheck
(74) *Attorney, Agent, or Firm* — Byrne Poh LLP

(57) ABSTRACT

Mechanisms, including systems, methods, and media, for processing sub-indirection unit sized data in a solid-state drive (SSD) are provided, the methods including: identifying, in a first portion of storage of the SSD, a plurality of indirection units each containing sub-indirection-unit-sized data and padding; combining the plurality of indirection units into a page-size data structure using a hardware processor; copying contents of the page-sized data structure to a second portion of storage of the SSD; and updating a data structure relating logical address of data to physical locations of data so that an entry corresponding to the sub-indirection-unit-sized data of one of the plurality of indirection units changes from having a physical address in the first portion of storage to having a physical address in the second portion of storage.

21 Claims, 4 Drawing Sheets

WRITE

200

202 Receive Host Write

204 Is Write Data Sub-IU?

No

Yes

210 Store the Write Data in the Main Storage

212 Set L2P Entry to Point to the Main Storage

206 Store the Write Data in the Sub-IU Storage

208 Set L2P Entry to Point to the Sub-IU Storage

READ

300

400

Migration

SYSTEMS, METHODS, AND MEDIA FOR PROCESSING SUB-INDIRECTION-UNIT DATA IN SOLID-STATE DRIVES

BACKGROUND

Solid-state drives (SSDs) are widely used in host computing devices for storing data, which can include data and/or programs.

In some instances, SSDs are used as a cache unit to absorb certain writes for data center racks for incoming write workloads and the workloads that are routed to these cache SSDs have sizes that are less than an indirection unit (IU) size for the SSD (i.e., the workloads are sub-IU sized) which are typically 4 Kbyte sized, which results in various sub-IU writes. In some of these instances, the SSDs receive a large number of sub-IU writes to the same set of logical block addresses (LBAs), and this creates a performance bottleneck.

Many SSDs have internal caches that are used to aggregate write data before the aggregated data is written to the SSD's main storage (e.g., NAND) and their firmware architectures are designed such that they do not support in-cache write replacement (due to this use case being less frequent in datacenter workloads). Because of this, when a write to an LBA corresponding to an entry already in the cache is received, the existing entry is evicted from the cache before the new entry can be entered. As such, multiple writes to the same LBA(s) not only block a significant amount of space in the cache, but write-on-write collisions of the same LBA(s) can lead to very long latencies as seen by the host on these colliding writes—incurring potentially multiple full stack firmware and NAND latency overheads.

Accordingly, new mechanisms for processing sub-indirection-unit data in SSDs are desirable.

SUMMARY

In accordance with some embodiments, new mechanisms, including systems, methods, and media, for processing sub-indirection-unit data in SSDs are provided.

In some embodiments, systems for processing sub-indirection unit sized data in a solid-state drive (SSD) are provided, the systems comprising: memory; and at least one hardware processor coupled to the memory and collectively configured to at least: identify, in a first portion of storage of the SSD, a plurality of indirection units each containing sub-indirection-unit-sized data and padding; combine the plurality of indirection units into a page-size data structure; copy contents of the page-sized data structure to a second portion of storage of the SSD; and update a data structure relating logical address of data to physical locations of data so that an entry corresponding to the sub-indirection-unit-sized data of one of the plurality of indirection units changes from having a physical address in the first portion of storage to having a physical address in the second portion of storage. In some of these embodiments, the at least one hardware processor is also configured to: receive a write request having sub-indirection-unit-sized data; determine that the sub-indirection-unit-sized data in the write request has a size that is less than a size of an indirection unit; and in response to determining that the sub-indirection-unit-sized data in the write request has a size that is less than the size of an indirection unit: store the sub-indirection-unit-sized data in the first portion of the storage; and create an entry in the data structure relating a logical address of the sub-indirection-unit-sized data in the write request to the physical address in the first portion of storage. In some of these embodiments, storing the sub-indirection-unit-sized data in the first portion of the storage comprises copying the sub-indirection-unit-sized data from a cache of the SSD to the first portion of storage. In some of these embodiments, the at least one hardware processor is also configured to pad the sub-indirection-unit-sized data after to copying the sub-indirection-unit-sized data from the cache of the SSD to the first portion of storage. In some of these embodiments, the sub-indirection-unit-sized data of the write request is stored in the one of the plurality of indirection units and wherein the at least one hardware processor is also configured to pad the sub-indirection-unit-sized data prior to copying the sub-indirection-unit-sized data from the cache of the SSD to the first portion of storage. In some of these embodiments, the first portion of the storage in random access memory. In some of these embodiments, the first portion of the storage has a lower storage density than the second portion of the storage. In some of these embodiments, the first portion of the storage has a faster write speed than the second portion of the storage.

In some embodiments, methods for processing sub-indirection unit sized data in a solid-state drive (SSD) are provided, the methods comprising: identifying, in a first portion of storage of the SSD, a plurality of indirection units each containing sub-indirection-unit-sized data and padding; combining the plurality of indirection units into a page-size data structure using a hardware processor; copying contents of the page-sized data structure to a second portion of storage of the SSD; and updating a data structure relating logical address of data to physical locations of data so that an entry corresponding to the sub-indirection-unit-sized data of one of the plurality of indirection units changes from having a physical address in the first portion of storage to having a physical address in the second portion of storage. In some of these embodiments, the methods further comprise: receiving a write request having sub-indirection-unit-sized data; determining that the sub-indirection-unit-sized data in the write request has a size that is less than a size of an indirection unit; and in response to determining that the sub-indirection-unit-sized data in the write request has a size that is less than the size of an indirection unit: storing the sub-indirection-unit-sized data in the first portion of the storage; and creating an entry in the data structure relating a logical address of the sub-indirection-unit-sized data in the write request to the physical address in the first portion of storage. In some of these embodiments, storing the sub-indirection-unit-sized data in the first portion of the storage comprises copying the sub-indirection-unit-sized data from a cache of the SSD to the first portion of storage. In some of these embodiments, the methods for further comprise padding the sub-indirection-unit-sized data after to copying the sub-indirection-unit-sized data from the cache of the SSD to the first portion of storage. In some of these embodiments, the sub-indirection-unit-sized data of the write request is stored in the one of the plurality of indirection units and the methods further comprise padding the sub-indirection-unit-sized data prior to copying the sub-indirection-unit-sized data from the cache of the SSD to the first portion of storage. In some of these embodiments, the first portion of the storage in random access memory. In some of these embodiments, the first portion of the storage has a lower storage density than the second portion of the storage. In some of these embodiments, the first portion of the storage has a faster write speed than the second portion of the storage.

In some embodiments, non-transitory computer-readable media containing computer executable instructions that, when executed by a processor, cause the processor to perform a method for processing sub-indirection unit sized data in a solid-state drive (SSD) are provided, the method comprising: identifying, in a first portion of storage of the SSD, a plurality of indirection units each containing sub-indirection-unit-sized data and padding; combining the plurality of indirection units into a page-size data structure; copying contents of the page-sized data structure to a second portion of storage of the SSD; and updating a data structure relating logical address of data to physical locations of data so that an entry corresponding to the sub-indirection-unit-sized data of one of the plurality of indirection units changes from having a physical address in the first portion of storage to having a physical address in the second portion of storage. In some of these embodiments, the methods further comprise: receiving a write request having sub-indirection-unit-sized data; determining that the sub-indirection-unit-sized data in the write request has a size that is less than a size of an indirection unit; and in response to determining that the sub-indirection-unit-sized data in the write request has a size that is less than the size of an indirection unit: storing the sub-indirection-unit-sized data in the first portion of the storage; and creating an entry in the data structure relating a logical address of the sub-indirection-unit-sized data in the write request to the physical address in the first portion of storage. In some of these embodiments, storing the sub-indirection-unit-sized data in the first portion of the storage comprises copying the sub-indirection-unit-sized data from a cache of the SSD to the first portion of storage. In some of these embodiments, the methods further comprise padding the sub-indirection-unit-sized data after to copying the sub-indirection-unit-sized data from the cache of the SSD to the first portion of storage. In some of these embodiments, the sub-indirection-unit-sized data of the write request is stored in the one of the plurality of indirection units and wherein the methods further comprise padding the sub-indirection-unit-sized data prior to copying the sub-indirection-unit-sized data from the cache of the SSD to the first portion of storage. In some of these embodiments, the first portion of the storage in random access memory. In some of these embodiments, the first portion of the storage has a lower storage density than the second portion of the storage. In some of these embodiments, the first portion of the storage has a faster write speed than the second portion of the storage.

DETAILED DESCRIPTION

In accordance with some embodiments, new mechanisms, including systems, methods, and media, for processing sub-indirection-unit data in SSDs are provided.

In some embodiments, when sub-indirection-unit write request data is received, this data can be temporarily stored in sub-indirection-unit (sub-IU) storage so that this data does not delay the processing of non-sub-IU write request data. A process monitoring the sub-IU storage can then align the sub-indirection-unit write request data to an IU size by padding the sub-indirection-unit write request data, and coalesce the padded sub-indirection-unit write request data so that data can be subsequently migrated to the main storage of the SSD (i.e., the data into which non-sub-IU write request data is also written).

When a read request is received for sub-indirection-unit write request data prior to the sub-indirection-unit write request data being padded, coalesced, and migrated to the main storage, the read request can be responded to from with the sub-indirection-unit write request data as stored in the sub-IU storage.

In some embodiments the sub-indirection-unit (sub-IU) storage can be a section of any suitable memory or combination of memories (e.g., DDR, NAND, or SRAM cache, and/or any other suitable memory) that is reserved for temporarily storing sub-indirection-unit write request data and processing it as described herein. As a more particular example, in some embodiments, in an SSD, this sub-indirection-unit (sub-IU) storage can be implemented in single-level cell (SLC) NAND when other NAND memory in the SSD is implemented as multi-level cell (MLC) NAND devices, triple-level cell (TLC) NAND devices, quad-level cell (QLC) NAND devices, penta-level cell (PLC) NAND, and/or any other suitable level of NAND that is higher than SLC.

Figure 1:
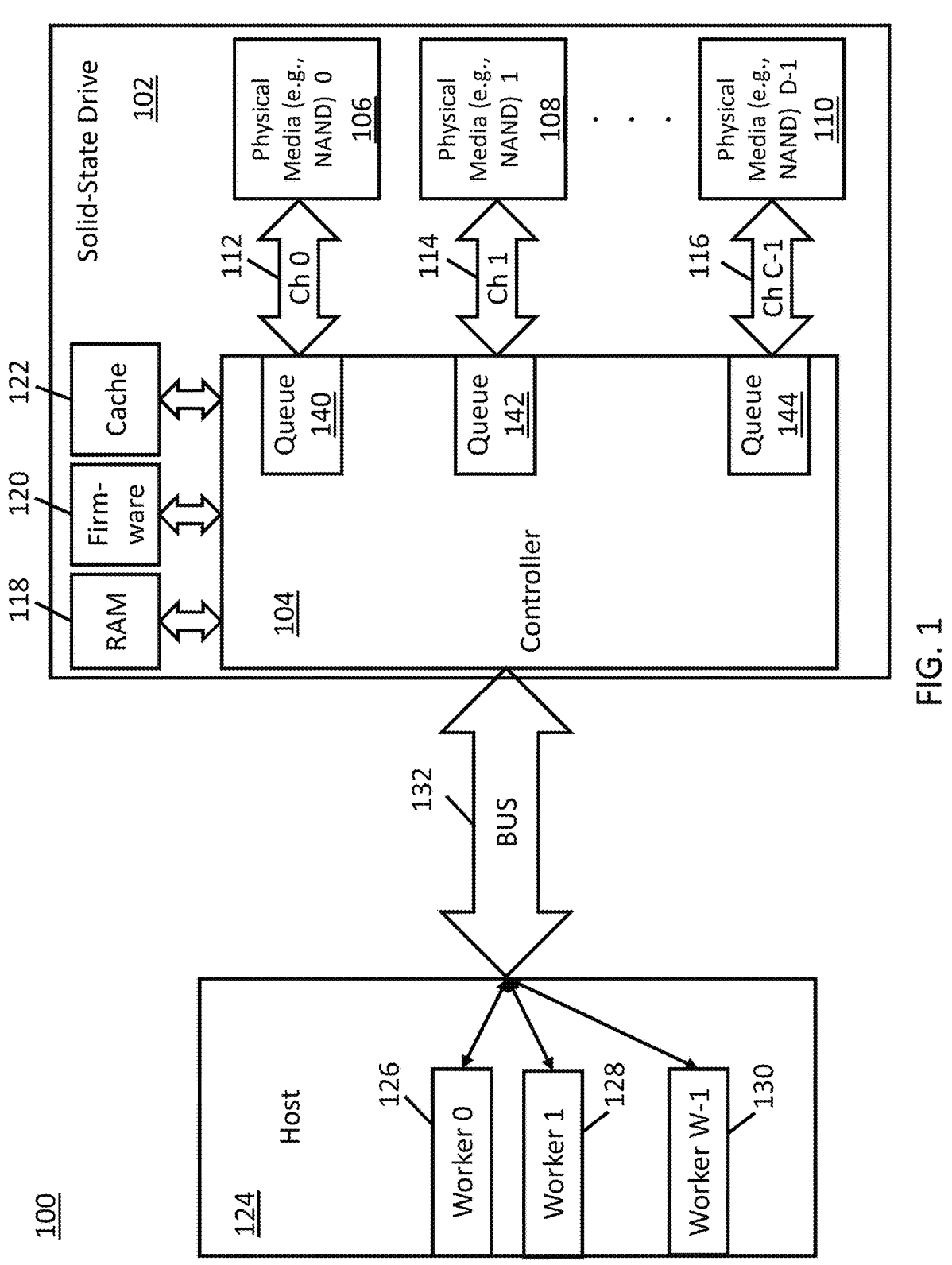
FIG. 1 is a block diagram of an example solid-state drive (SSD) in accordance with some embodiments.

Turning to FIG. 1, an example block diagram of a solid-state drive 102 coupled to a host device 124 via a bus 132 in accordance with some embodiments is illustrated.

As shown, solid-state drive 102 can include a controller 104, physical media (e.g., NAND devices) 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc. In some embodiments, controller 104 can be coupled to, or include (as shown), channel queues 140, 142, and 144 for transmitting commands (which can include command data) over channels 140, 142, and 144 to physical media 106, 108, and 110, respectively.

Physical media 106, 108, and 110 can be any suitable physical media for storing information (which can include data, programs, and/or any other suitable information that can be stored in a solid-state drive) in some embodiments. For example, the physical media can be NAND devices in some embodiments.

The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media (such as single-level cell (SLC) NAND devices, multilevel cell (MLC) NAND devices, triple-level cell (TLC) NAND devices, quad-level cell (QLC) NAND devices, penta-level cell (PLC) NAND, NAND with suitable levels of cells, 2D NAND devices, 3D NAND devices, NOR flash memory, any other suitable flash technology, phase change memory technology, and/or other any other suitable volatile and/or non-volatile memory storage technology) can be used in some embodiments. Each physical media can have any suitable size in some embodiments. While physical media 106, 108, and 110 can be implemented using NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers W can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

As described above, in accordance with some embodiments, a workload type can be determined by a machine learning classifier. In order for a machine learning classifier to determining a workload type, the machine learning classifier can be trained to do so and/or be configured to do so based on another machine learning classifier that was trained to do so.

Any suitable storage (or portion thereof) of the SSD can be used for of the sub-IU storage in some embodiments. For example, in some embodiments, the sub-IU storage can be implemented in RAM 1118, cache 122, and/or physical media 106. In some embodiments, when implemented in physical media 106, the sub-IU storage can be implemented in SLC NAND media. In some embodiments, when sub-IU storage is implemented in RAM, any suitable temporary power supply (e.g., a suitable battery and/or capacitor) and power-failure recovery mechanism can be implemented to prevent sub-IU data temporarily stored in the sub-IU storage from being lost due to a power failure.

Figure 2:
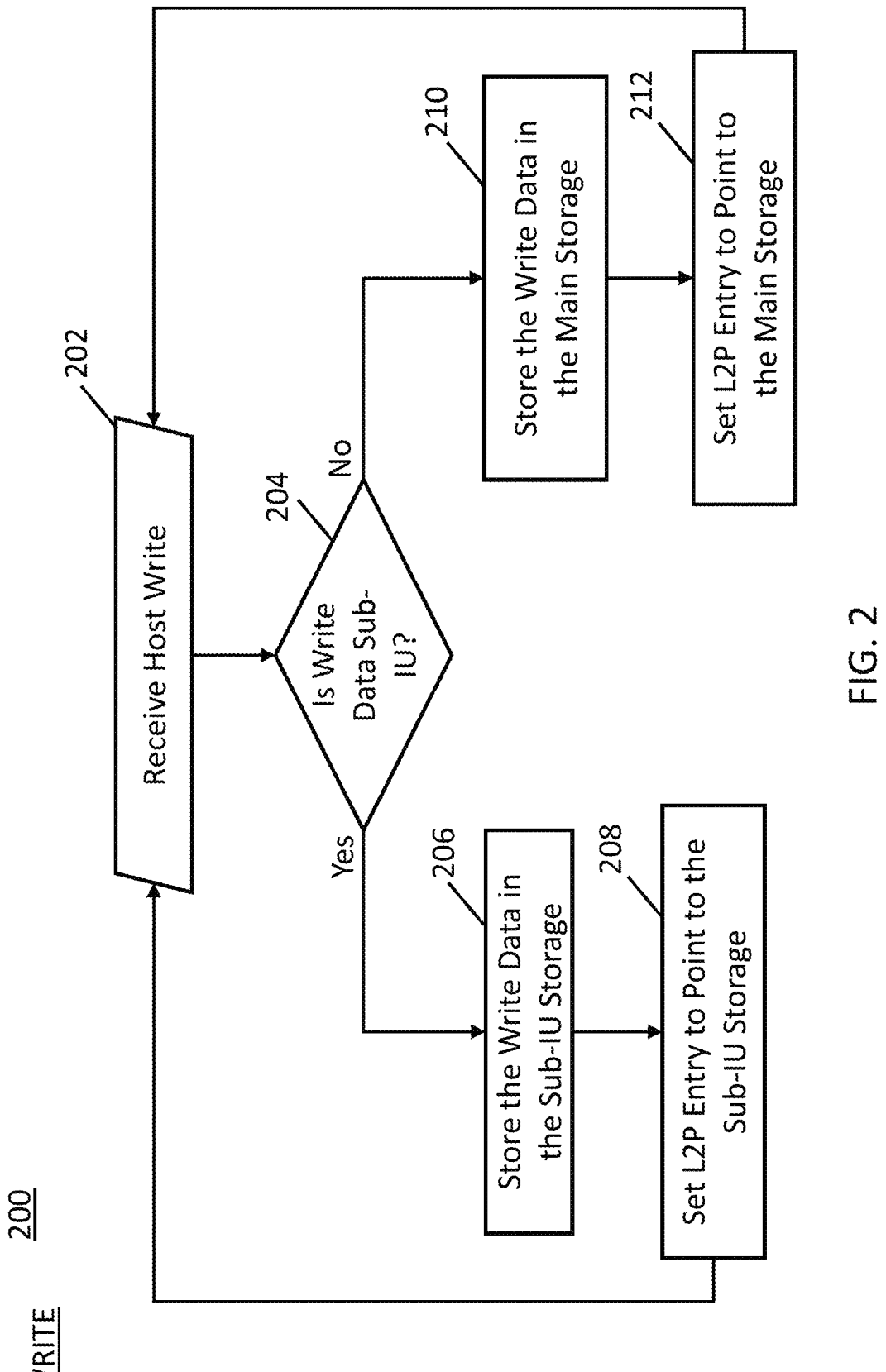
FIG. 2 is a flow diagram of an example process for processing host write requests in an SSD in accordance with some embodiments.

Turning to FIG. 2, a flow diagram of an example process 200 for processing host write requests in accordance with some embodiments is illustrated. Process 200 can be executed by controller 104 of FIG. 1, in some embodiments.

As shown, after process 200 begins, at 202, the process receives a host write request. This request can be received in any suitable manner and have any suitable content, in some embodiments.

Next, at 204, process 200 determines if the write data has a sub-IU size. This determination can be made in any suitable manner, in some embodiments. For example, in some embodiments, process 200 can compare the size of the write data to the SSD's IU size. If it is determined at 204 that the write data has sub-IU size, then process 200 branches to 206. Otherwise, process 200 branches to 210.

At 206, process 200 next stores the write data in the sub-IU storage. The write data can be stored to the sub-IU storage in any suitable manner, in some embodiments. For example, in some embodiments, the write data can be stored to the sub-IU storage as unpadded data that is sub-IU in size. As another example, in some embodiments, the write data can be padded and stored to the sub-IU storage as padded data that is IU in size.

Next, at 208, process 200 sets a logical-to-physical (L2P) entry in an L2P table (or other data structure) to point to a portion of the sub-IU storage in which the write data was written. Setting the L2P entry can be performed in any suitable manner in some embodiments.

As noted above, if it is determined at 204 that the write data is not sub-IU sized, then process 200 branches to 210. At 210, process 200 stores the write data in the main storage of the SSD. This can be performed in any suitable manner, in some embodiments.

Next, at 212, process 200 sets a logical-to-physical (L2P) entry in an L2P table (or other data structure) to point to a portion of the main storage in which the write data was written. Setting the L2P entry can be performed in any suitable manner in some embodiments.

After completing 208 or 212, process 200 loops back to 202.

Figure 3:
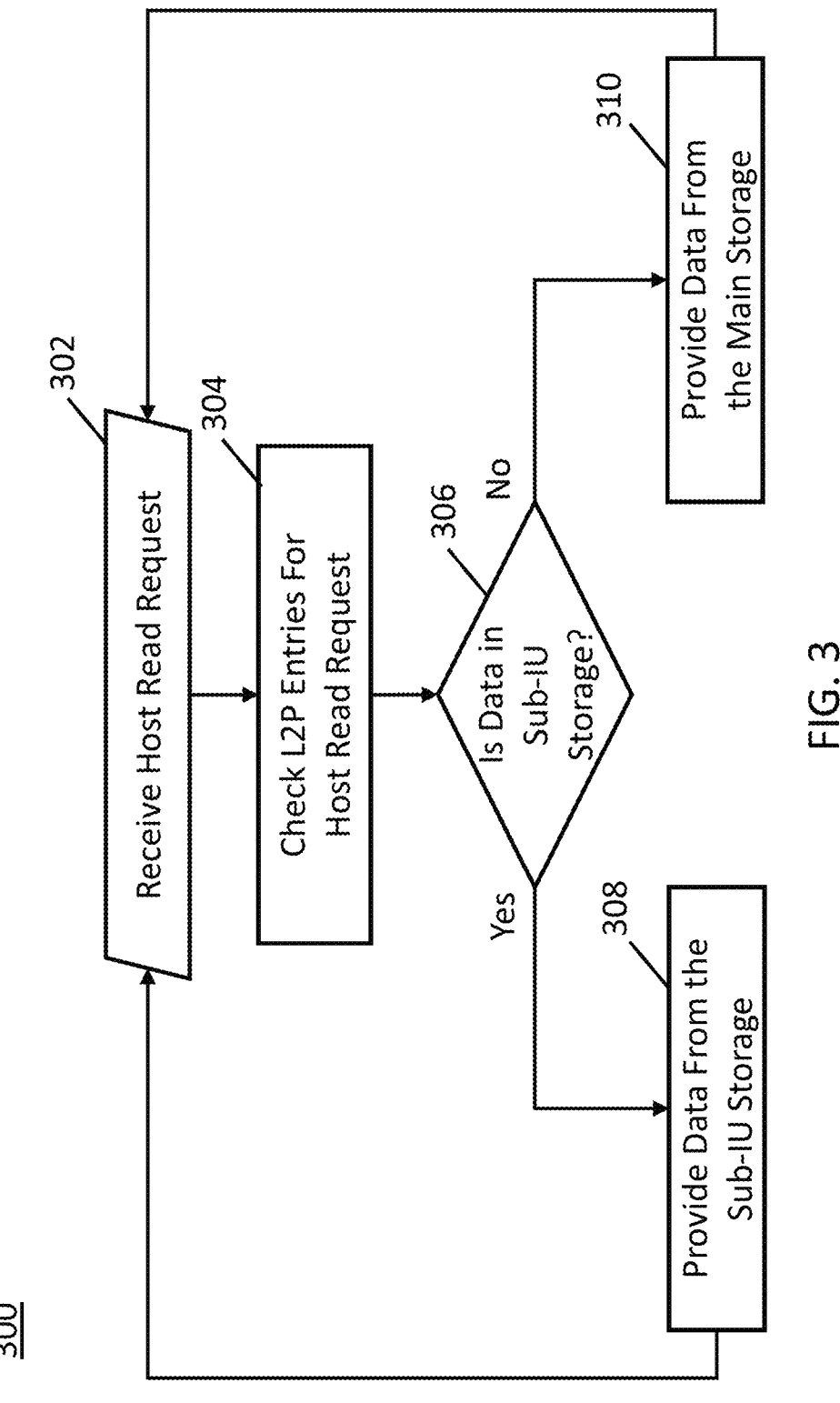
FIG. 3 is a flow diagram of an example process for processing host read requests in an SSD in accordance with some embodiments.

Turning to FIG. 3, a flow diagram of an example process 300 for processing host read requests in accordance with some embodiments is illustrated. Process 300 can be executed by controller 104 of FIG. 1, in some embodiments.

As shown, after process 300 begins, at 302, the process receives a host read request. This request can be received in any suitable manner and have any suitable content, in some embodiments.

Next, at 304, process 300 checks the L2P entries for data corresponding to the host read request. This check can be performed in any suitable manner in some embodiments. For example, in some embodiments, this check can access a table of L2P entries for an entry corresponding to a logical address specified in the read request and retrieve a physical address corresponding to the read request.

Then, at 306, process 300 determines if the read data is in the sub-IU storage. This determination can be made in any suitable manner, in some embodiments. For example, this determination can be made based on a physical address returned from the L2P entry at 304 corresponding to the sub-IU storage or not.

If it is determined at 306 that the data is in the sub-IU storage, process 300 branches to 308, at which it provides the data to the host from the sub-IU storage and then loops back to 302. Data can be provided from the sub-IU storage in any suitable manner, in some embodiments.

If it is determined at 306 that the data is not in the sub-IU storage, process 300 branches to 310, at which it provides the data to the host from the main storage and then loops back to 302. Data can be provided from the main storage in any suitable manner, in some embodiments.

While 306 is illustrated as determining if the data is store in the sub-IU storage, at 306, process 300 could alternatively determine if the data is stored in the main storage, proceed to 310 if so, and proceed to 308 otherwise.

Figure 4:
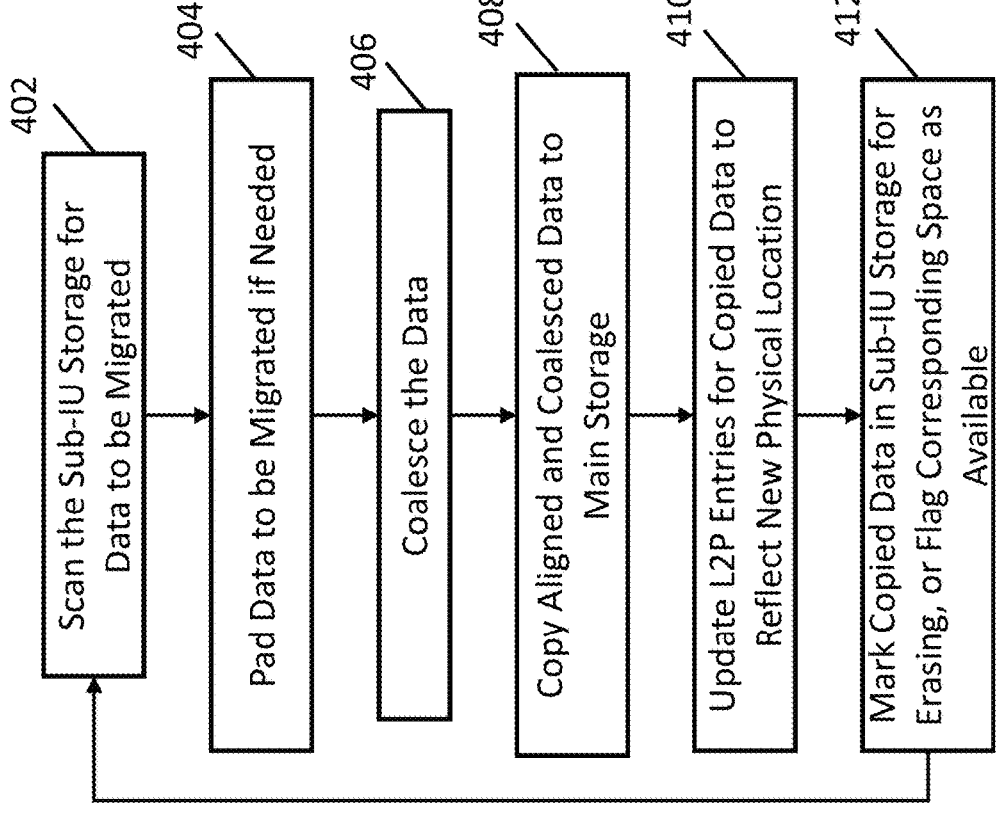
FIG. 4 is a flow diagram of an example process for migrating data stored in sub-IU storage to main storage in accordance with some embodiments.

Turning to FIG. 4, a flow diagram of an example process 400 for migrating the data stored in the sub-IU storage to the main storage in accordance with some embodiments is illustrated. Process 400 can be executed by controller 104 of FIG. 1, in some embodiments.

As shown, after process 400 begins, at 402, the process scans the sub-IU storage for data to be migrated. This scanning can be performed in any suitable manner and at any suitable frequency, in some embodiments.

Next, at 404, process 400 pads data to be migrated if needed. In some embodiments, padding might not be needed if the data was padded prior to or when the data was written to the sub-IU storage. Padding the data can be performed in any suitable manner, in some embodiments. For example, in some embodiments, padding the data can be performed be appending data values (e.g., zero) to the data to make the data has an IU size. More particularly, for example, in some embodiments, if the sub-IU data is 1 Kbytes in size and the IU size is 4 Kbytes, 3 Kbytes of zeros (or any other suitable values or values) can be appended to the 1 Kbyte of sub-IU data to form an IU of data with padding.

Then, at 406, process 400 coalesces the data with padding in the sub-IU storage. This coalescing can be performed in any suitable manner in some embodiments. For example, in some embodiments, this coalescing can combine multiple IUs worth of data with padding into a page worth of data. More particularly, for example, if four sets of 1 Kbyte of data with 3 Kbytes of padding is in the sub-IU storage, each totaling 4 Kbytes in size, these four sets can be combined together into a single 16 Kbyte page so that this page can be subsequently migrated to main storage.

At 408, process 400 next copies the aligned and coalesced data the sub-IU storage to the main storage of the SSD. This copying can be performed in any suitable manner, in some embodiments. For example, in some embodiments, this copying can be performed by reading the aligned and coalesced data from the sub-IU storage and writing the data directly to the main storage. As another example, in some embodiments, this copying can be performed by reading the aligned and coalesced data from the sub-IU storage and writing the data to a cache used to write non-sub-IU data to the main storage (e.g., as is performed at 210 and 212 of FIG. 2).

Next, at 410, process 400 updates L2P entries for the copied data to reflect new physical location in the main storage when the L2P entries are not otherwise updated by another mechanism (e.g., 212 of FIG. 2). This updating can be performed in any suitable manner, in some embodiments. For example, in some embodiments, this updating can be performed by writing the new physical address of each data item to the corresponding L2P entry in the L2P data structure.

Then, at 412, process 400 marks the copied data in the sub-IU storage for erasing (e.g., when the sub-IU storage is implemented in NAND), or flags the corresponding space in the sub-IU storage as available (e.g., when the sub-IU storage is implemented in RAM). This marking or flagging can be performed in any suitable manner, in some embodiments.

It should be understood that at least some of the above-described blocks of the processes of FIGS. 2, 3, and 4 can be executed or performed in any order or sequence not limited to the order and sequence shown in and described in the figures. Also, some of the above blocks of the processes of FIGS. 2, 3, and 4 can be executed or performed substantially simultaneously where appropriate or in parallel to reduce latency and processing times. Additionally or alternatively, some of the above described blocks of the processes of FIGS. 2, 3, and 4 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for processing sub-indirection unit sized data in a solid-state drive (SSD), comprising:
 memory; and
 at least one hardware processor coupled to the memory and collectively configured to at least:
  receive, from a host, a read request to read sub-indirection-unit-sized data;

in response to receiving the read request from the host, provide the sub-indirection-unit-sized data from a first portion of the storage of the SSD to the host;

after providing the sub-indirection-unit-sized data to the host:

pad the sub-indirection-unit-sized data in the first portion of the storage of the SSD;

identify, in the first portion of storage of the SSD, a plurality of indirection units each containing a corresponding set of sub-indirection-unit-sized data and padding, wherein the sub-indirection-unit-sized data is stored in the one of the plurality of indirection units;

combine the plurality of indirection units into a page-size data structure;

copy contents of the page-sized data structure to a second portion of storage of the SSD; and update a data structure relating logical address of data to physical locations of data so that an entry corresponding to the corresponding set of sub-indirection-unit-sized data of one of the plurality of indirection units changes from having a physical address in the first portion of storage to having a physical address in the second portion of storage.

2. The system of claim 1, wherein the at least one hardware processor is also configured to:

receive a write request having sub-indirection-unit-sized data;

determine that the sub-indirection-unit-sized data in the write request has a size that is less than a size of an indirection unit; and in response to determining that the sub-indirection-unit-sized data in the write request has a size that is less than the size of an indirection unit:

store the sub-indirection-unit-sized data in the first portion of the storage; and create an entry in the data structure relating a logical address of the sub-indirection-unit-sized data in the write request to the physical address in the first portion of storage.

3. The system of claim 2, where storing the sub-indirection-unit-sized data in the first portion of the storage comprises copying the sub-indirection-unit-sized data from a cache of the SSD to the first portion of storage.

4. The system of claim 3, wherein the at least one hardware processor is also configured to pad the sub-indirection-unit-sized data after copying the sub-indirection-unit-sized data from the cache of the SSD to the first portion of storage.

5. The system of claim 1, wherein the first portion of the storage is random access memory.

6. The system of claim 1, wherein the first portion of the storage has a lower storage density than the second portion of the storage.

7. The system of claim 1, wherein the first portion of the storage has a faster write speed than the second portion of the storage.

8. A method for processing sub-indirection unit sized data in a solid-state drive (SSD), comprising:

receiving, from a host, a read request to read sub-indirection-unit-sized data;

in response to receiving the read request from the host, providing the sub-indirection-unit-sized data from a first portion of the storage of the SSD to the host; and after providing the sub-indirection-unit-sized data to the host:

pad the sub-indirection-unit-sized data in the first portion of the storage of the SSD;

identifying, in the first portion of storage of the SSD, a plurality of indirection units each containing a corresponding set of sub-indirection-unit-sized data and padding, wherein the sub-indirection-unit-sized data is stored in the one of the plurality of indirection units;

combining the plurality of indirection units into a page-size data structure using a hardware processor;

copying contents of the page-sized data structure to a second portion of storage of the SSD; and updating a data structure relating logical address of data to physical locations of data so that an entry corresponding to the corresponding set of sub-indirection-unit-sized data of one of the plurality of indirection units changes from having a physical address in the first portion of storage to having a physical address in the second portion of storage.

9. The method of claim 8, further comprising:

receiving a write request having sub-indirection-unit-sized data;

determining that the sub-indirection-unit-sized data in the write request has a size that is less than a size of an indirection unit; and in response to determining that the sub-indirection-unit-sized data in the write request has a size that is less than the size of an indirection unit:

storing the sub-indirection-unit-sized data in the first portion of the storage; and creating an entry in the data structure relating a logical address of the sub-indirection-unit-sized data in the write request to the physical address in the first portion of storage.

10. The method of claim 9, where storing the sub-indirection-unit-sized data in the first portion of the storage comprises copying the sub-indirection-unit-sized data from a cache of the SSD to the first portion of storage.

11. The method of claim 10, further comprising padding the sub-indirection-unit-sized data after copying the sub-indirection-unit-sized data from the cache of the SSD to the first portion of storage.

12. The method of claim 8, wherein the first portion of the storage is random access memory.

13. The method of claim 8, wherein the first portion of the storage has a lower storage density than the second portion of the storage.

14. The method of claim 8, wherein the first portion of the storage has a faster write speed than the second portion of the storage.

15. A non-transitory computer-readable medium containing computer executable instructions that, when executed by a processor, cause the processor to perform a method for processing sub-indirection unit sized data in a solid-state drive (SSD), the method comprising:

receiving, from a host, a read request to read sub-indirection-unit-sized data;

in response to receiving the read request from the host, providing the sub-indirection-unit-sized data from a first portion of the storage of the SSD to the host; and after providing the sub-indirection-unit-sized data to the host:

pad the sub-indirection-unit-sized data in the first portion of the storage of the SSD;

identifying, in the first portion of storage of the SSD, a plurality of indirection units each containing a corresponding set of sub-indirection-unit-sized data and padding, wherein the sub-indirection-unit-sized data is stored in the one of the plurality of indirection units;

combining the plurality of indirection units into a page-size data structure;

copying contents of the page-sized data structure to a second portion of storage of the SSD; and updating a data structure relating logical address of data to physical locations of data so that an entry corresponding to the corresponding set of sub-indirection-unit-sized data of one of the plurality of indirection units changes from having a physical address in the first portion of storage to having a physical address in the second portion of storage.

16. The non-transitory computer-readable medium of claim 15, wherein the method further comprises:

receiving a write request having sub-indirection-unit-sized data;

determining that the sub-indirection-unit-sized data in the write request has a size that is less than a size of an indirection unit; and in response to determining that the sub-indirection-unit-sized data in the write request has a size that is less than the size of an indirection unit:

storing the sub-indirection-unit-sized data in the first portion of the storage; and creating an entry in the data structure relating a logical address of the sub-indirection-unit-sized data in the write request to the physical address in the first portion of storage.

17. The non-transitory computer-readable medium of claim 16, where storing the sub-indirection-unit-sized data in the first portion of the storage comprises copying the sub-indirection-unit-sized data from a cache of the SSD to the first portion of storage.

18. The non-transitory computer-readable medium of claim 17, wherein the method further comprises padding the sub-indirection-unit-sized data after copying the sub-indirection-unit-sized data from the cache of the SSD to the first portion of storage.

19. The non-transitory computer-readable medium of claim 15, wherein the first portion of the storage is random access memory.

20. The non-transitory computer-readable medium of claim 15, wherein the first portion of the storage has a lower storage density than the second portion of the storage.

21. The non-transitory computer-readable medium of claim 15, wherein the first portion of the storage has a faster write speed than the second portion of the storage.

\* \* \* \* \*